(12) United States Patent
Ota (10) Patent No.: US 7,777,821 B2
(45) Date of Patent: Aug. 17, 2010

(54) LIQUID CRYSTAL DISPLAY DEVICE

(75) Inventor: Akio Ota, Tottori (JP)

(73) Assignee: Epson Imaging Devices Corporation (JP)

(*) Notice: Subject to any disclaimer, the term of this patent is extended or adjusted under 35 U.S.C. 154(b) by 0 days.

(21) Appl. No.: 12/504,752

(22) Filed: Jul. 17, 2009

(65) Prior Publication Data

US 2010/0066646 A1  Mar. 18, 2010

(30) Foreign Application Priority Data

Sep. 12, 2008 (JP) ............................. 2008-234375

(51) Int. Cl.
*G02F 1/1343* (2006.01)
(52) U.S. Cl. ............................. 349/39; 349/19; 349/33; 349/38; 349/43; 349/46
(58) Field of Classification Search .................. 349/19, 349/33, 38, 39, 43, 46
See application file for complete search history.

(56) References Cited

U.S. PATENT DOCUMENTS 7,557,880 B2 * 7/2009 Liu et al. ..................... 349/114

2010/0022042 A1 * 1/2010 Hong ............................ 438/30

FOREIGN PATENT DOCUMENTS

| JP | 2584290 | 11/1996 |
|----|---------|---------|
| JP | 9-120082 | 5/1997 |
| JP | 2006-184859 | 7/2006 |
| JP | 2006-276591 | 10/2006 |
| JP | 2008-164740 | 7/2008 |

* cited by examiner

*Primary Examiner*—Jennifer Doan
(74) *Attorney, Agent, or Firm*—Harness, Dickey & Pierce, P.L.C.

(57) ABSTRACT

A dual-display liquid crystal display device concurrently displays two images so that the two images can be identified from two different viewing directions by including sub-pixel areas each having therein a first storage capacitor section extending along a scanning line and a second storage capacitor section extending along a signal line, and further, makes the characteristics of brightness relative to a viewing angle associated with the two different viewing directions be line-symmetric with each other. The dual-display liquid crystal display device realizes an increased aperture by locating each storage capacitor section within a light-shielding area and by having rectangular display regions.

4 Claims, 11 Drawing Sheets

LIQUID CRYSTAL DISPLAY DEVICE

This application claims the benefit of Japanese Patent Application No. 2008-234375, filed on Sep. 12, 2008. The entire disclosures of the prior applications are hereby incorporated by reference herein in their entirety.

BACKGROUND

1. Technical Field

The present invention relates to dual-display liquid crystal display devices which enable displaying of two images concurrently so that the two images can be identified from two different viewing directions, respectively. More particularly, the present invention relates to a dual-display liquid crystal display device which includes sub-pixel areas each having therein a first storage capacitor section extending along a scanning line and a second storage capacitor section extending along a signal line, and further, makes the characteristics of brightness relative to a viewing angle associated with the two different viewing directions be line-symmetric with each other.

2. Field of Invention

Liquid crystal display displays, which are characterized by lightness in weight, small thickness and low power consumption as compared with cathode-ray tubes (CRTs), have been used for various types of electrical devices. A principle for displaying images employed in such a liquid crystal display device is such that, an amount of transmitted light or an amount of reflected light varies in accordance with alignment direction changes of individual liquid crystal molecules in proportion to the intensity of an electric field applied to the liquid crystal molecules, each of which is initially aligned in a prescribed direction resulting from a rubbing process performed on alignment films having the liquid crystal molecules interposed therebetween. Such an electric field is generated between each pair of electrodes to which a voltage difference is applied, and further, in order to allow viewers to identify images being displayed on the liquid crystal display device, it is necessary to configure a storage capacitor section corresponding to each pair of electrodes so as to retain the voltage difference for a prescribed constant time within a period of scanning time.

Meanwhile, in navigation devices, a dual-display liquid crystal display device is well known, in which, taking traffic safety into consideration, a first image, such as a navigation image, is configured to be displayed towards a driving seat, and concurrently therewith, a second image, such as a TV or DVD image, is configured to be displayed towards a front passenger seat. Among technologies which realize a liquid crystal display device in which, from different viewing directions, the corresponding different images can be identified, a technology employing a light-shielding film having slits formed therein (refer to JP-A-2006-184859), a technology employing a lenticular lens (refer to JP-A-2006-276591), and a technology employing a vertical alignment film which is formed on projections formed in a strip pattern (refer to JP-A-2006-276591), are publicly known. Hereinafter, a configuration of each storage capacitor section included in an existing liquid crystal display device will be described with reference to FIG. 10.

Figure 10:
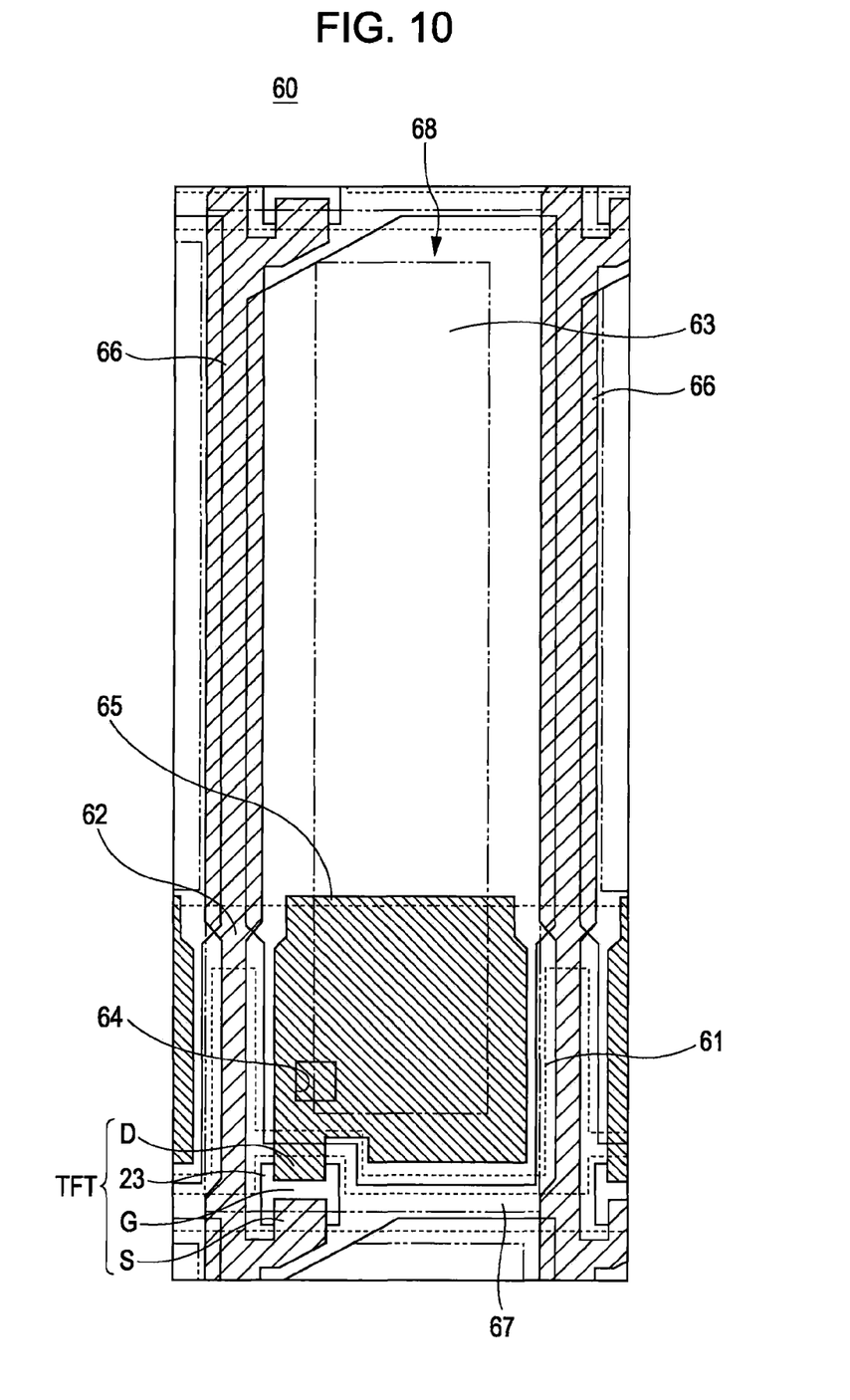
FIG. 10 is a plan view illustrating a storage capacitor section in one sub-pixel area of an existing liquid crystal display device.

FIG. 10 is a plan view illustrating a storage capacitor section in one sub-pixel area of an existing liquid crystal display device.

In a liquid crystal display device 60 shown in FIG. 10, a lower storage capacitor electrode 61, which is one of electrodes forming a storage-capacitor section, is formed in each sub-pixel area. The lower storage capacitor electrode 61 is electrically connected to a storage capacitor line 62 which is formed so as to be parallel with a scanning line 67. A thin film transistor (TFT) operating as a switching element has a drain electrode D, which extends up to a position being overlapping, in plan view, the lower storage capacitor electrode 61 and forms an upper storage capacitor electrode 65. Further, the drain electrode D is electrically connected to a pixel electrode 63 via a contact hole 64. A storage capacitor section is formed of the upper storage capacitor electrode 65 and the lower storage capacitor electrode 61, and further, an insulating film (not shown in figures). In addition, in such a liquid crystal display device as disclosed in Japanese Patent No. 2,584,290, there is a case where the pixel electrode 63 composed of a transparent material is used as the upper storage capacitor electrode. Additionally, a portion denoted by a reference symbol 68 represents one of apertures formed in a barrier, which allow either of two images to be viewed from an oblique direction, in the case where the liquid crystal display device 60 operates as a dual-display liquid crystal device.

Forming a drain electrode and storage capacitor electrodes with a transparent conductive material leads to increasing of the resistance thereof, and, thus, makes it impossible to obtain a desired amount of capacitance, and further, results in arising of variation in the level of a voltage supplied to each pixel electrode and increasing of electric crosstalk. Therefore, in order to reduce the resistance, in general, the drain electrode and the storage capacitor electrodes are composed of an opaque metallic material, such as aluminum or an aluminum base alloy. However, forming the drain electrode and the storage capacitor electrodes with an opaque metallic material leads to a disadvantage in that an aperture ratio is decreased. Therefore, in order to increase the aperture ratio, in such a liquid crystal display device as disclosed in JP-A-9-120082, a method, in which a storage capacitor section is formed of two portions which extend along signal lines located at both sides of each sub-pixel area, respectively, and are disposed, in plan view, within a light-shielding area of a display panel, has been considered.

In general, in existing dual-display liquid crystal display devices, in order to ensure that a light ray emitted from each sub-pixel area in a viewing direction does not leak into light rays emitted from sub-pixel areas adjacent thereto in a different viewing direction, a light-shielding area is provided that is of dimensions larger than the dimensions of a light-shielding area for preventing light-ray leakage between adjacent sub-pixel areas, employed in general liquid crystal display devices. Therefore, in such a dual-display liquid crystal display device as disclosed in JP-A-2008-164740, a method, in which a storage capacitor line is formed so as to extend along a signal line and is located, in plan view, within a light-shielding area included in the dual-display liquid crystal display device, has been considered. This dual-display liquid crystal display device disclosed in JP-A-2008-164740 will be described below with reference to FIG. 11. In addition, in FIG. 11, elements the same as those included in the liquid crystal display device 60 shown in FIG. 10 are denoted by the same reference symbols, and further, detailed description of the same elements will be omitted below.

Figure 11:
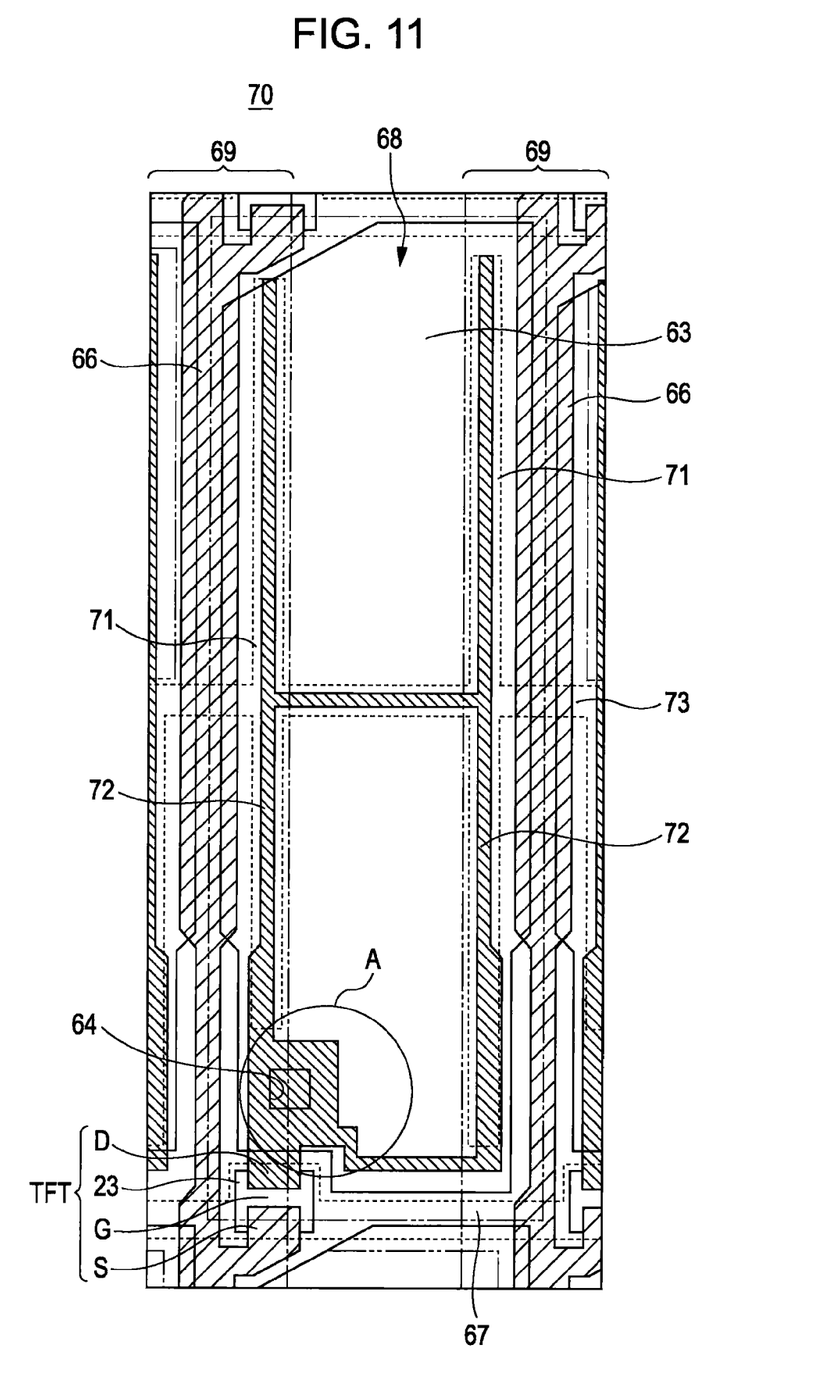
FIG. 11 is a plan view illustrating a one sub-pixel area of an existing dual-display liquid crystal display device.

FIG. 11 is a plan view illustrating a one sub-pixel area of a dual-display liquid crystal display device disclosed in JP-A-2008-164740.

In a dual-display liquid crystal display device 70 shown in FIG. 11, a storage capacitor lower electrode 71 and a storage capacitor upper electrode 72, which form a storage capacitor section, are formed so as to extend along signal lines 66. The storage capacitor lower electrode 71 is formed by extending a drain electrode D composed of a metallic material, and similarly, the storage capacitor upper electrode 72 is formed by extending a storage capacitor line 73 composed of a metallic material. Therefore, both the storage capacitor lower electrode 71 and the storage capacitor upper electrode 72 are opaque, and thus, are formed within a barrier 69, in plan view, so as not to reduce an aperture ratio, and further, so as not to be exposed through an aperture 68 formed in the barrier 69 when viewed from an oblique direction.

However, in the dual-display liquid crystal display device 70 disclosed in JP-A-2008-164740, a configuration, in which the barrier (i.e., the light-shielding area) 69, which enables a liquid crystal display device to operate as a dual-display liquid crystal display device, covers only both side-edge portions but does not cover upper and lower portions of a one sub-pixel area leads to a problem due to the existence of a drain electrode D, which is specific to the dual-display liquid crystal display device 70. That is, in the existing dual-display liquid crystal display device 70, the drain electrode D of a TFT, which is electrically connected to a pixel electrode 63 via a contact hole 64 and is formed so as to have dimensions made as small as possible in order to increase an aperture ratio, does not make the shape of a display region of the sub-pixel area be symmetric with respect to a centerline between signal lines located at both sides of the sub-pixel area (refer to a portion "A" shown in FIG. 11), thus, does not make the characteristic of brightness in the dual-display liquid crystal display device 70, which is disclosed in JP-A-2008-164740, relative to a viewing angle be bilaterally symmetric, and, for example, causes a difference between the brightness of sub-pixel areas displaying a first image viewed from a viewing direction extending to a driving seat and the brightness of sub-pixel areas displaying a second image viewed from a viewing direction extending to a front passenger seat. Such a difference between the brightnesses of the two groups of sub-pixel areas viewed from two different directions causes two problems specific to the dual-display liquid crystal display device, one being a difference between the brightness of the two images viewed from the two viewing directions, the other one being a difference between a mixed color of three primary colors and a desired color, with respect to the two images viewed from the two viewing directions.

SUMMARY

Accordingly, it is desired to provide a dual-display liquid crystal display device enabling realization of an increased aperture by locating each storage capacitor section within a light-shielding area, and by making the shape of each display region be rectangular, the characteristics of brightness relative to a viewing angle associated with the two viewing directions are made line-symmetric with each other.

A dual-display liquid crystal display device according to an aspect of the invention includes a display panel configured to include therein first sub-pixels displaying a first image and second sub-pixels displaying a second image, the first sub-pixels and the second sub-pixels being alternately and adjacently disposed, and a barrier panel configured to include therein a light-shielding film having apertures therein which allow the first image and the second image to be identifiable from a first viewing direction and a second viewing direction, respectively, wherein the display panel is configured to be a liquid crystal display device including a first substrate and a second substrate being located so as to be opposite each other and having a liquid crystal layer interposed therebetween, wherein the first substrate includes therein scanning lines and signal lines arrayed in a matrix, thin film transistors each being formed adjacent a position where one of the scanning lines and one of the signal lines intersect each other, storage capacitor lines formed so as to be parallel with the scanning lines, and sub-pixels each having therein a storage capacitor lower electrode formed by extending one of the storage capacitor lines, a storage capacitor upper electrode formed by extending a drain electrode of one of the thin film transistors, and an insulating film formed between the storage capacitor lower electrode and the storage capacitor upper electrode, and further, the storage capacitor lower electrode, the storage upper electrode and the insulating film form a storage capacitor section, wherein the storage capacitor upper electrode includes a first upper electrode extending along the scanning lines and a second upper electrode extending along the signal lines, and the storage capacitor lower electrode includes a first lower electrode extending along the scanning lines and a second lower electrode extending along the signal lines, wherein, from the first viewing direction and the second viewing direction, the first upper electrode and the first lower electrode are configured to have a portion exposed out of a light-shielding area of the barrier panel, the shape of the exposed portion being symmetric with respect to a centerline between the signal lines, and the second upper electrode and the second lower electrode are configured to be overlapped, in plan view, by the light-shielding area of the barrier panel.

The dual-display liquid crystal display device according to the aspect of the invention includes a display panel including therein first sub-pixels displaying a first image and second sub-pixels displaying a second image, the first sub-pixels and the second sub-pixels being alternately and adjacently disposed, and a barrier panel including a light-shielding film having apertures therein, which allow the first image and the second image to be identifiable from a first viewing direction and a second viewing direction, respectively. Such a configuration as described above allows, for example, the first image to be viewable from a driving seat but not to be viewable from a front passenger seat, and the second image to be viewable from the front passenger seat but not to be viewable from the driving seat.

Furthermore, in the dual-display liquid crystal display device according to the aspect of the invention, a storage capacitor upper electrode forming a storage capacitor section includes a first upper electrode extending along the scanning lines and a second upper electrode extending along the signal lines, and a storage capacitor lower electrode includes a first lower electrode extending along the scanning lines and a second lower electrode extending along the signal lines, and further, from the first viewing direction and the second viewing direction, the first upper electrode and the first lower electrode are configured to have a portion exposed out of a light-shielding area of the barrier panel, the shape of the exposed portion being symmetric with respect to a centerline between the signal lines, and the second upper electrode and the second lower electrode are configured to be overlapped, in plan view, by the light-shielding area of the barrier panel. Such a configuration as described above makes the shape of the portion exposed out of the light-shielding area of the barrier panel in each sub-pixel be symmetric with respect to a centerline between the signal lines formed at both sides of the sub-pixel, and thus, makes the characteristic of brightness relative to a viewing angle, associated with each of the displays, be bilaterally symmetric. Further, since the second upper electrode and the second lower electrode, which form the storage capacitor section, are formed so as to be overlapped, in plan view, by the light-shielding area of the barrier panel, forming the second upper electrode and the second lower electrode does not lead to reducing of the aperture ratio. Therefore, in the dual-display liquid crystal display device according to the aspect of the invention, the characteristic of brightness relative to a viewing angle, associated with each of the displays, can be bilaterally symmetric, and further, a high aperture ratio can be realized, and thus, displaying of images with high brightness can be achieved.

The dual-display liquid crystal display device according to the aspect of the invention, preferably, the length of the second upper electrode extending along the signal lines is shorter than or equal to half the length along the signal line of the sub-pixel.

When forming a semiconductor layer of a TFT during a manufacturing process of the first substrate included in the dual-display liquid crystal display device, provided that, a semiconductor material remains in a portion between one of the signal lines and the second upper electrode, this portion forms a part of the TFT, which causes a bright dot defect. However, in the dual-display liquid crystal display device according to the preferable aspect of the invention, since the extension length of the second upper electrode is made short, it is possible to reduce the probability of occurrence of the described-above bright dot defect.

Further, the dual-display liquid crystal display device according to the aspect of the invention, preferably, the second upper electrode is formed of two electrodes extending along the signal lines at both sides of the sub-pixel, respectively.

In the dual-display liquid crystal display device according to this preferable aspect of the invention, since the two electrodes, which extend along the signal lines formed at both sides of each sub-pixel, respectively, are shielded, in plan view, by a shielding area of the barrier panel corresponding to the sub-pixel, it is possible to achieve a large storage capacitance without reducing an aperture ratio.

Further, in the dual-display liquid crystal display device according to the aspect of the invention, the second upper electrode may be formed of one electrode extending along the signal line at one side of the sub-pixel.

In this dual-display liquid crystal display device according to the preferable aspect of the invention, since the second upper electrode can be formed so as not to be close to a signal line connected to an adjacent sub-pixel, it is possible to reduce the probability of occurrence of electric crosstalk due to the signal line connected to the adjacent sub-pixel, through which a control signal different from a control signal used for the currently-targeted sub-pixel is inputted.

DESCRIPTION OF EXEMPLARY EMBODIMENTS

Exemplary embodiments according to aspects of the invention will be hereinafter described with reference to the accompanying drawings. Additionally, the exemplary embodiments described below are mere examples of a dual-display liquid crystal display device according to aspects of the invention, which are described in order to embody technical ideas of the invention, and further, the invention is not intended to be limited to the exemplary examples but can be equivalently applied to any other embodiments falling within the scope of appended claims of the invention. In addition, in each drawing used for explanations in this patent specification, so as to allow respective layers and members to have sizes identifiable from the drawing, respective layers and members are illustrated at different scales and are not illustrated in proportion to actual sizes thereof.

First Embodiment

Figure 1:
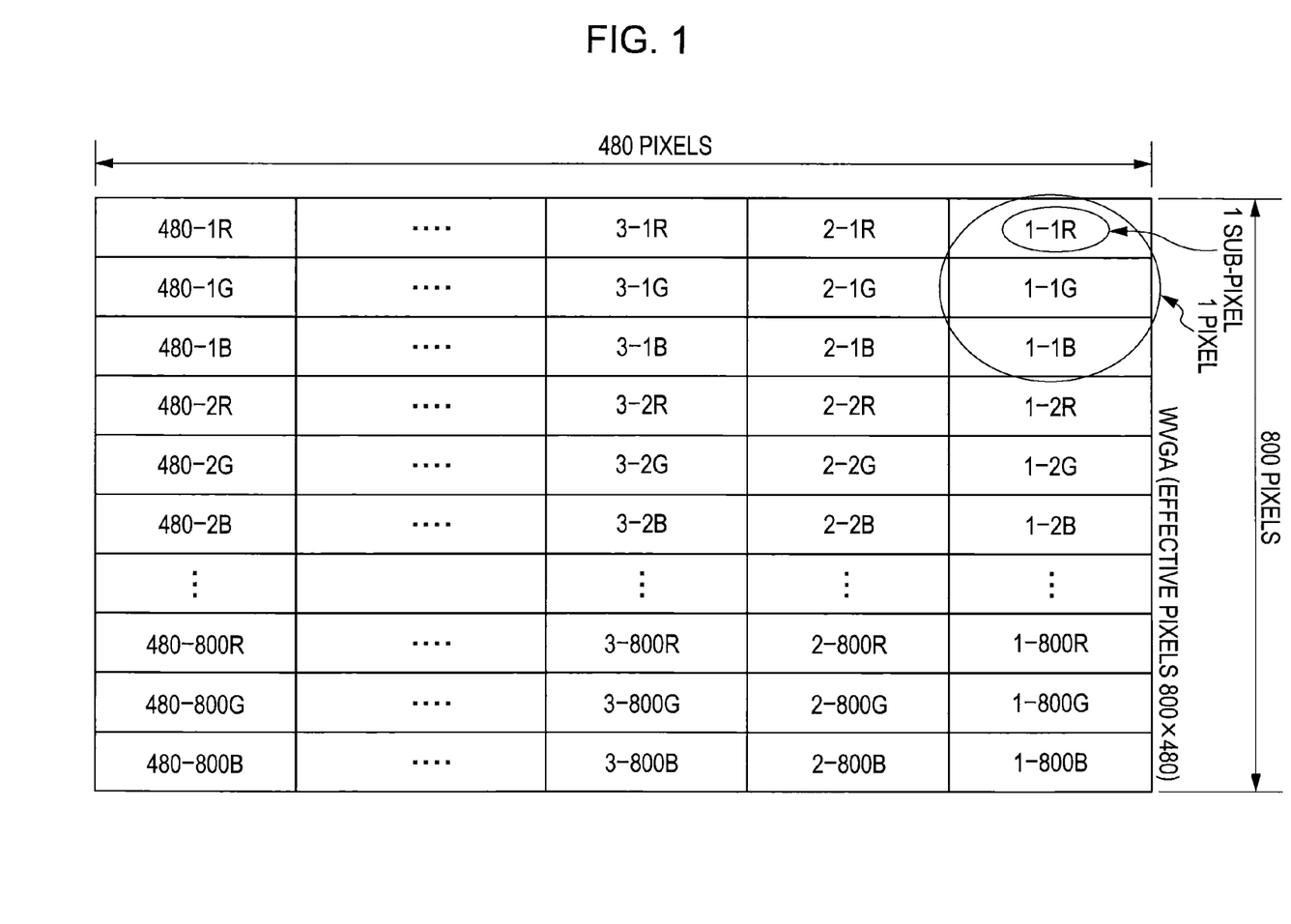
FIG. 1 is a figure illustrating a configuration of pixels in a display panel according to a first embodiment of the invention.
Figure 2:
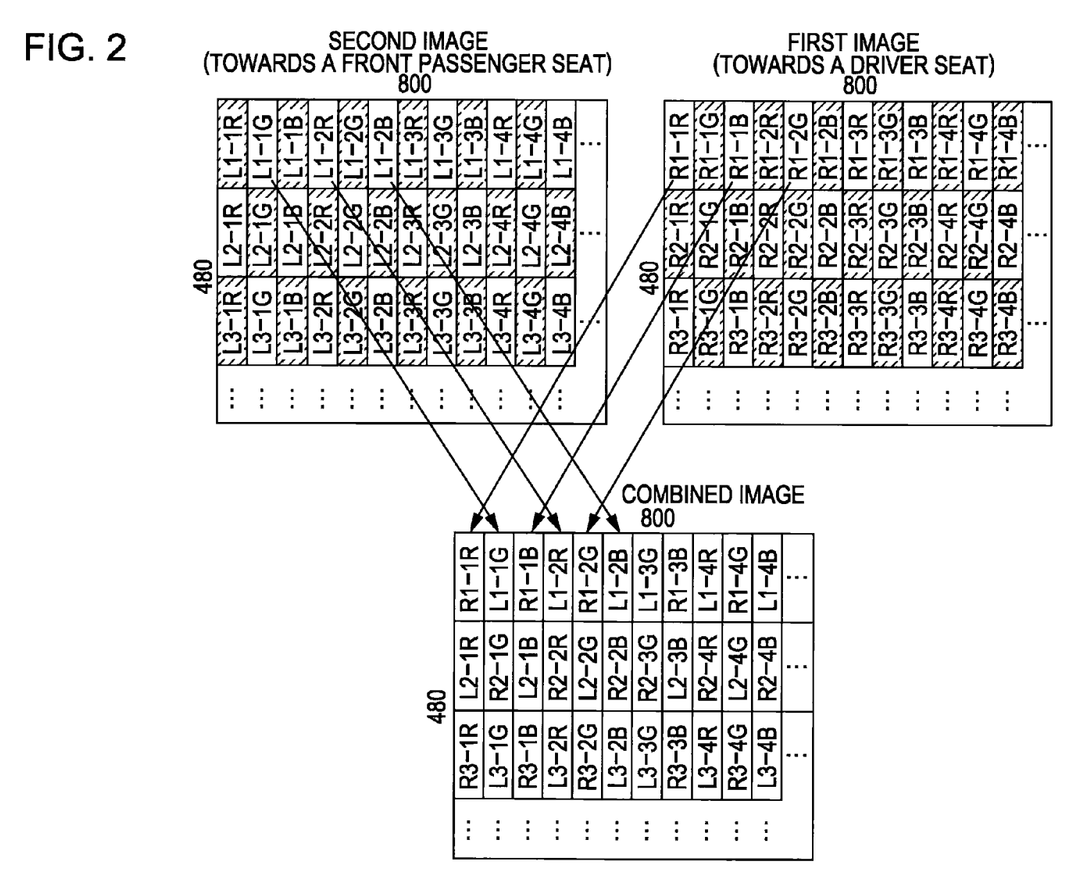
FIG. 2 is a figure illustrating a method of combining two images into an image inputted to a display panel.
Figure 3:
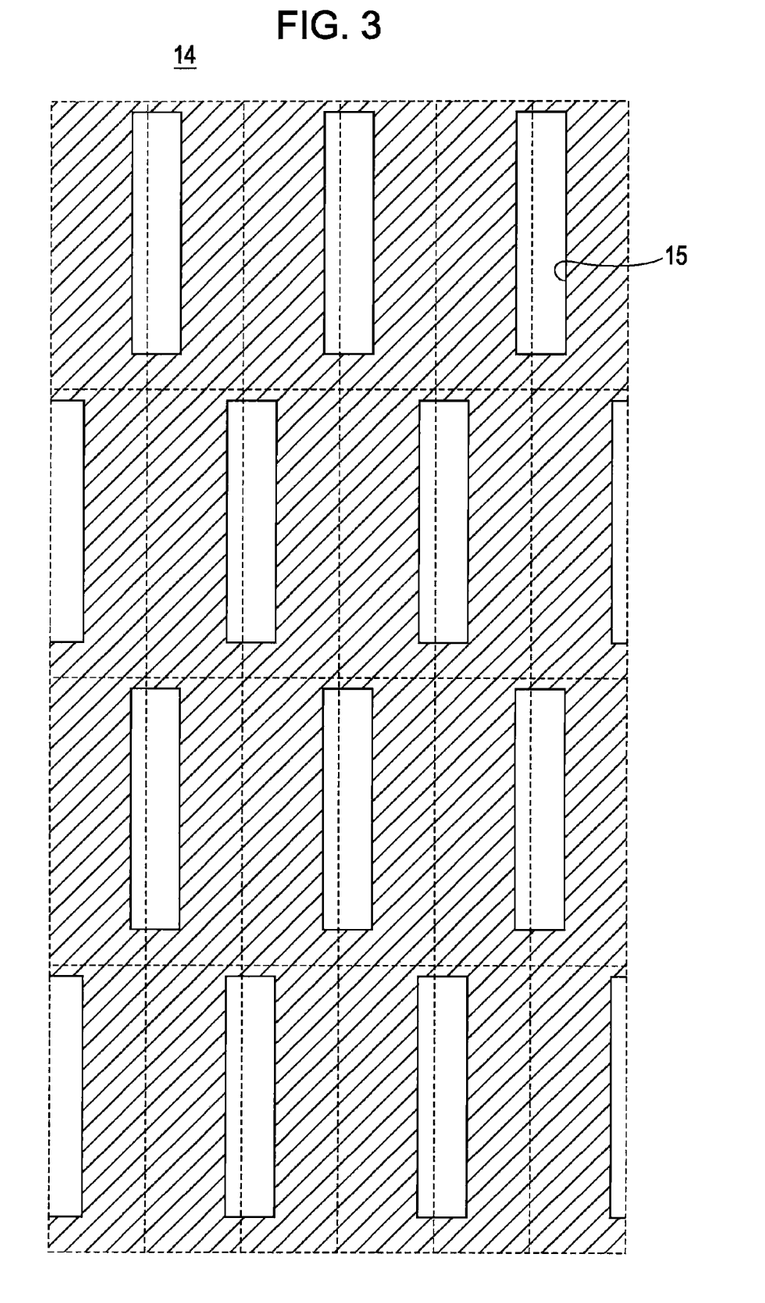
FIG. 3 is a figure illustrating apertures formed in a barrier panel.
Figure 4A:
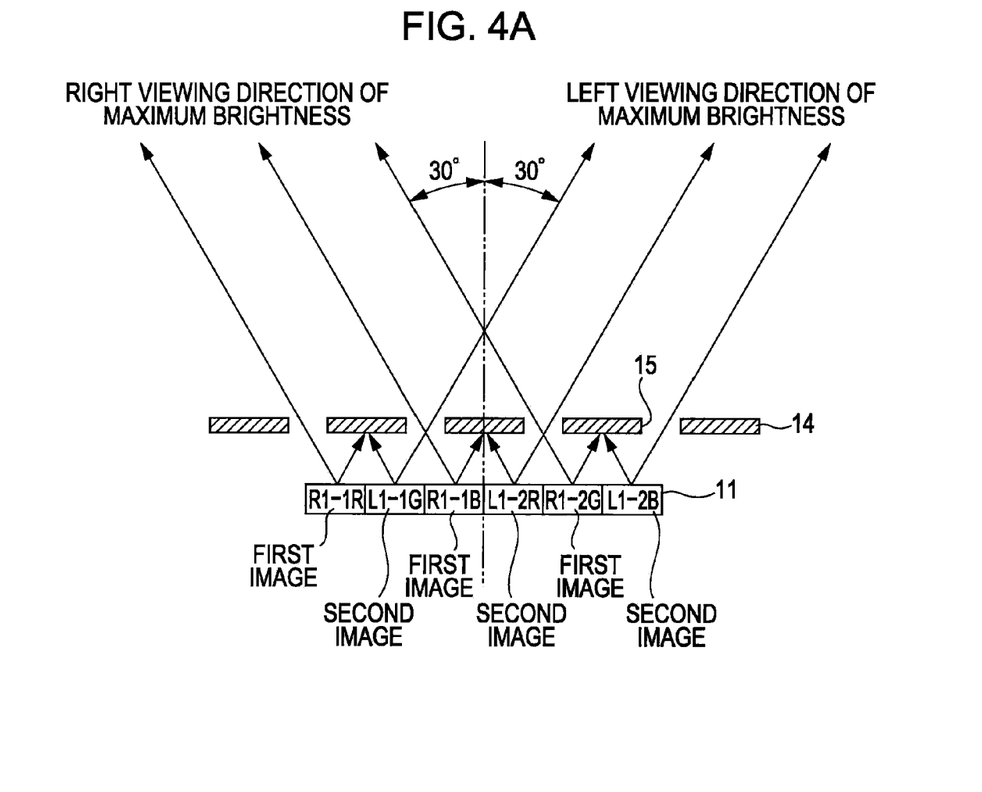
FIG. 4A is a figure illustrating a principle of a dual-display liquid crystal display device.
Figure 4B:
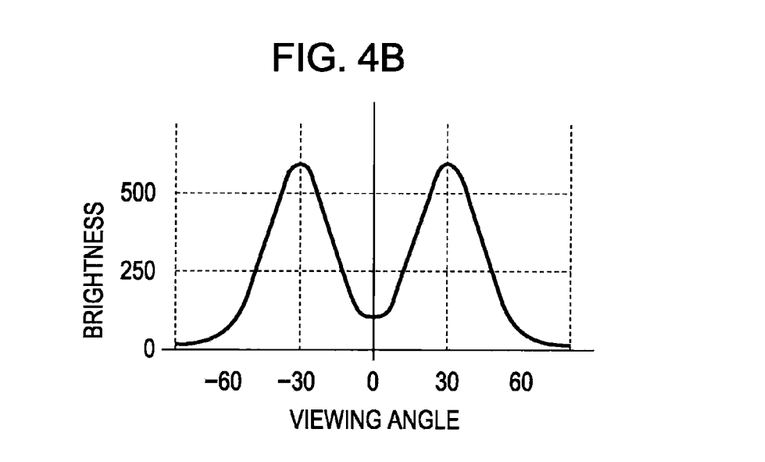
FIG. 4B is a figure illustrating an overall characteristic of brightness relative to a viewing angle with respect to a dual display.
Figure 5:
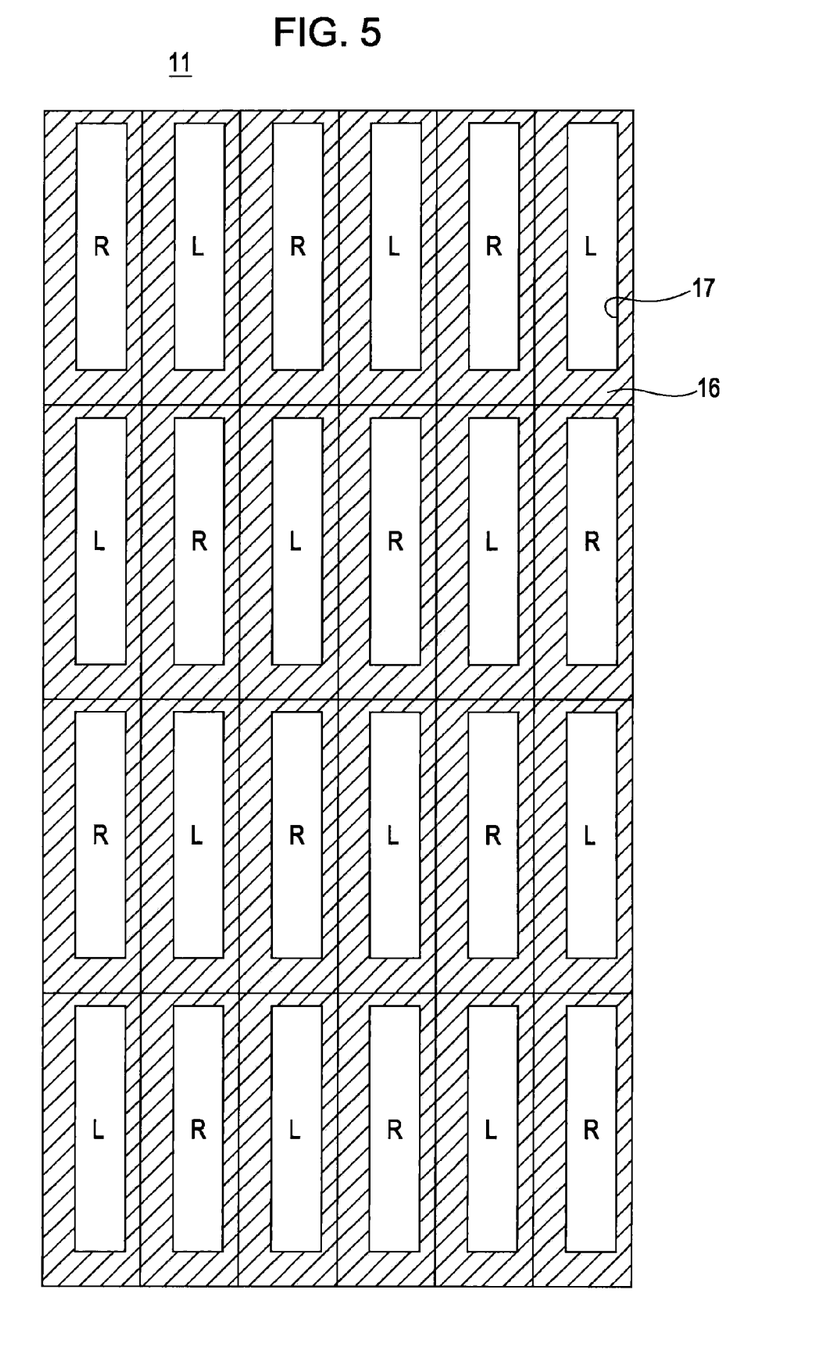
FIG. 5 is a figure illustrating image overlapping of an image viewed from a right-oblique direction and an image viewed from a left-oblique direction.
Figure 6:
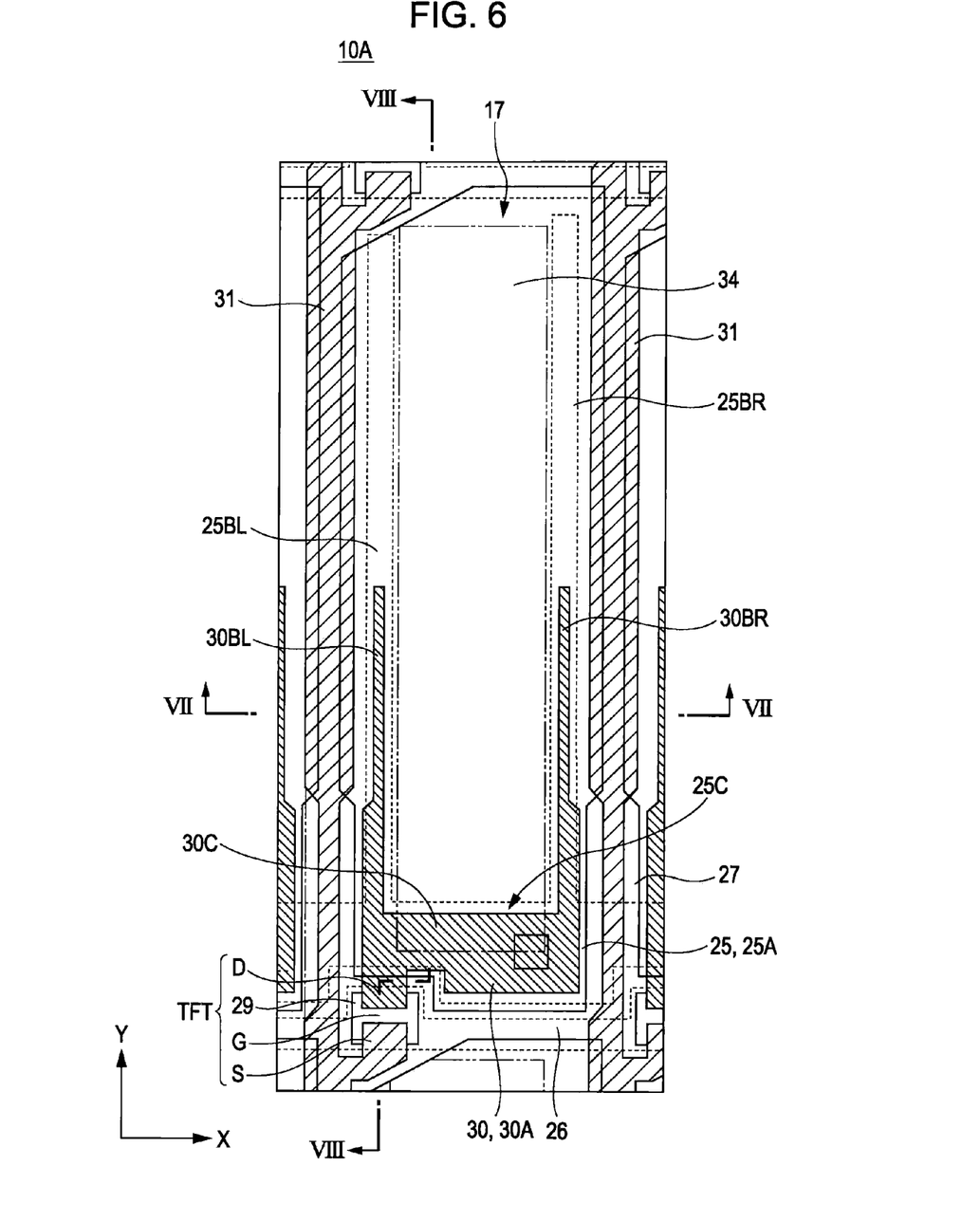
FIG. 6 is a schematic plan view illustrating a one sub-pixel area in an array substrate of a liquid crystal display device according to a first embodiment of the invention.
Figure 7:
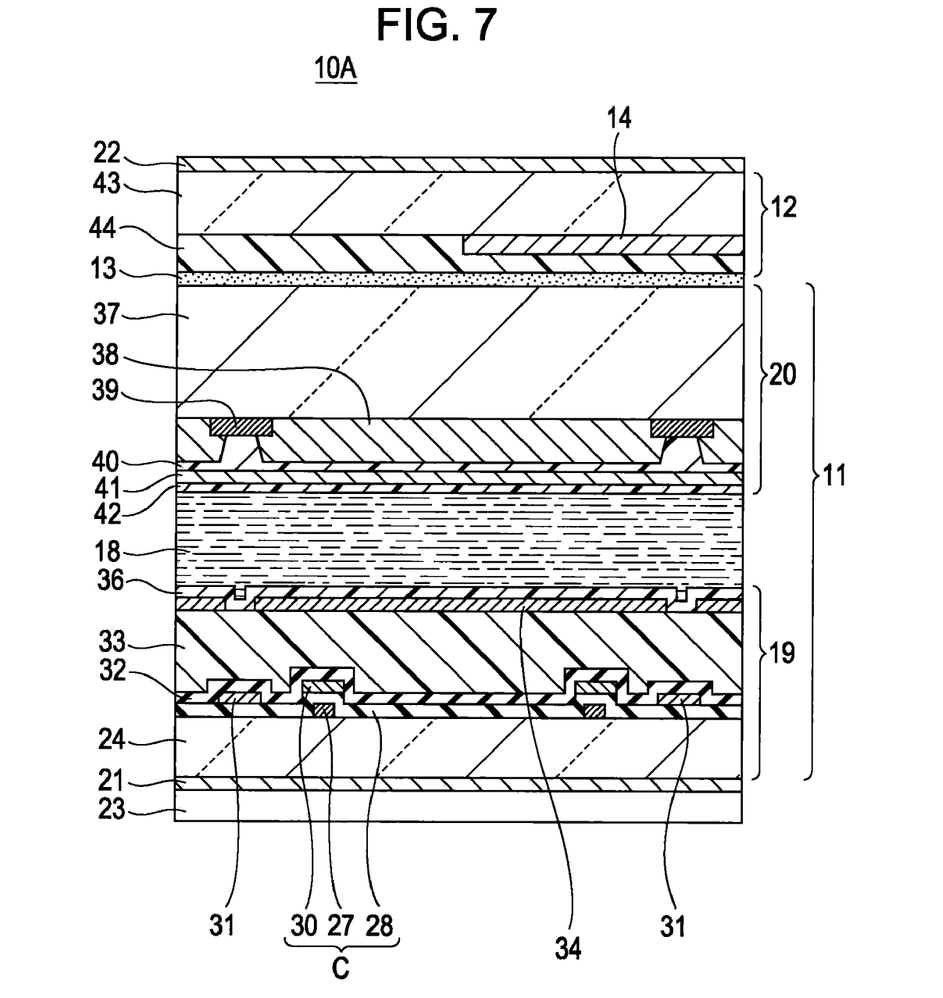
FIG. 7 is a sectional view taken along the line VII-VII of FIG. 6.
Figure 8:
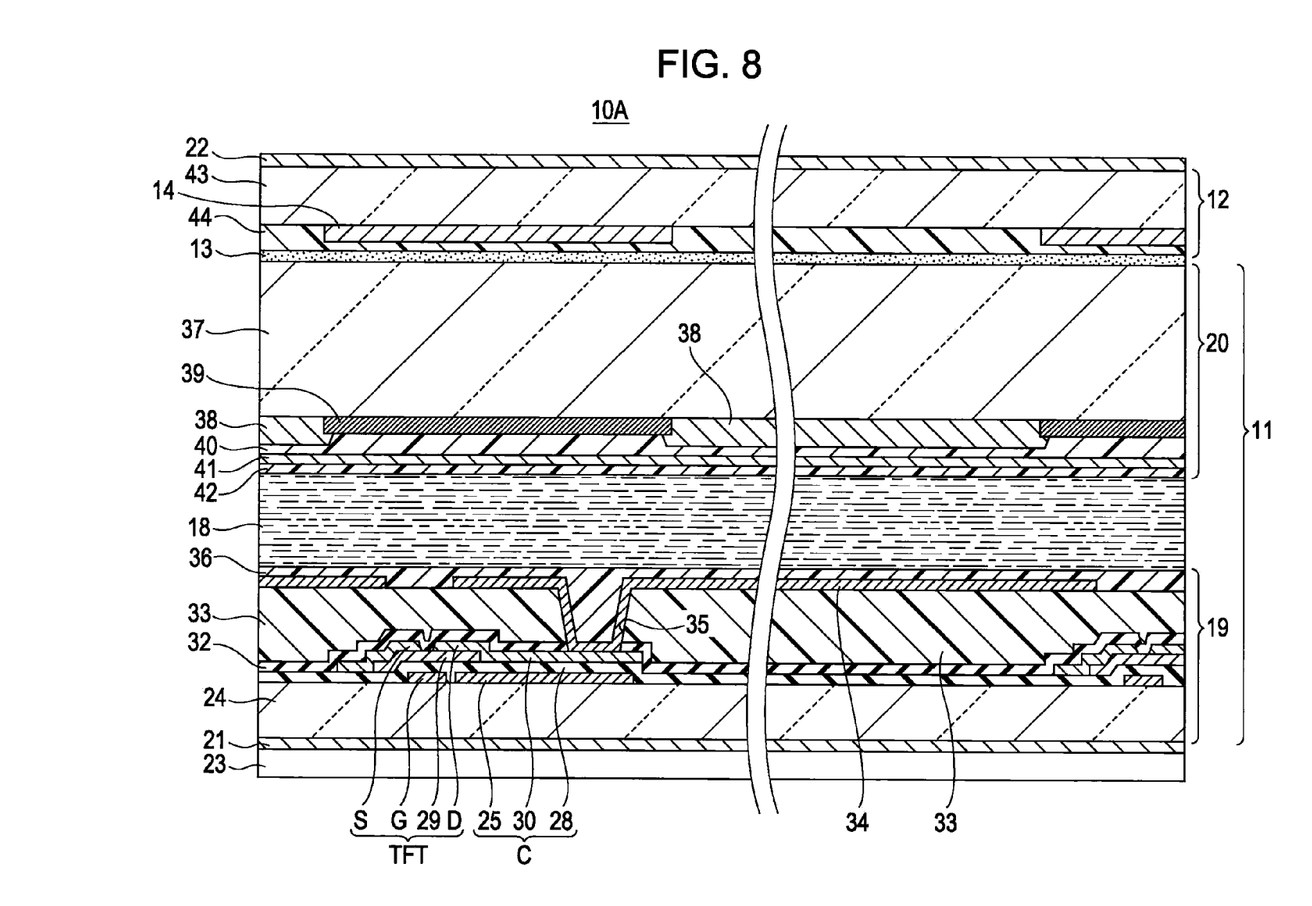
FIG. 8 is a sectional view taken along the line VIII-VIII of FIG. 6.
Figure 9:
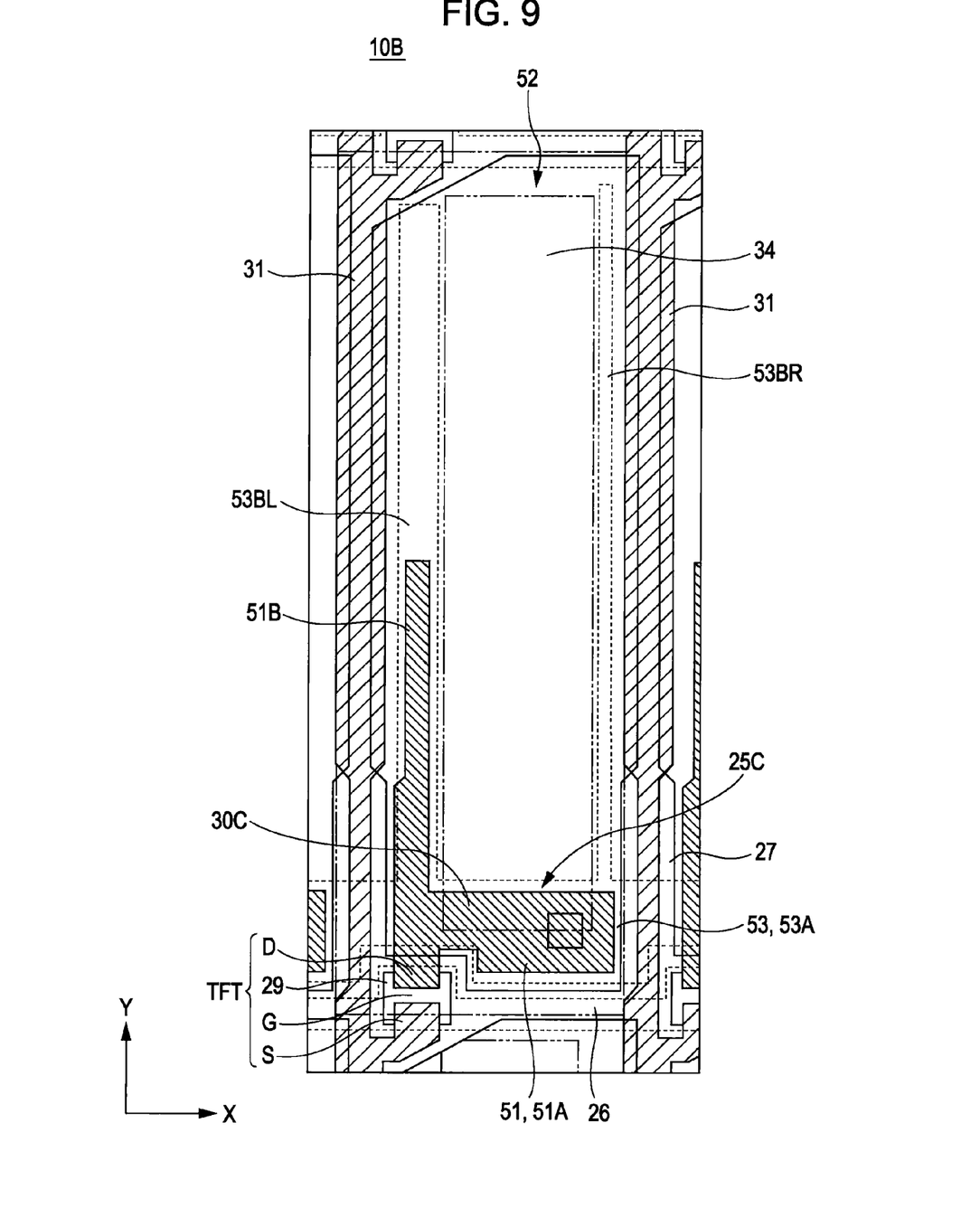
FIG. 9 is a schematic plan view corresponding to FIG. 6, in a second embodiment of the invention.

FIG. 1 is a figure illustrating a configuration of pixels according to a first embodiment of the invention. FIG. 2 is a figure illustrating a method of combining two images into an image inputted to a display panel. FIG. 3 is a figure illustrating apertures formed in a barrier panel. FIG. 4A is a figure illustrating a principle of a dual-display liquid crystal display device. FIG. 4B is a figure illustrating an overall characteristic of brightness relative to a viewing angle with respect to a dual display. FIG. 5 is a figure illustrating image overlapping of an image viewed from a right-oblique direction and an image viewed from a left-oblique direction. FIG. 6 is a schematic plan view illustrating a one sub-pixel area in an array substrate of a dual-display liquid crystal display device according to a first embodiment of the invention. FIG. 7 is a sectional view taken along the line VII-VII of FIG. 6. FIG. 8 is a sectional view taken along the line VIII-VIII of FIG. 6. FIG. 9 is a schematic plan view corresponding to FIG. 6, in a second embodiment of the invention.

Firstly, a configuration with respect to a principle for a dual-display liquid crystal display device according to aspects of the invention will be described below with reference to FIGS. 1 to 8. Additionally, a dual-display liquid crystal display device 10A shown in FIGS. 1 to 8 is an example of a dual-display liquid crystal display device operating as a navigation device, and will be described below on the assumption that the dual-display liquid crystal display device 10A is configured to allow a first image (i.e., a navigation image) to be displayed so as to be viewable from a right viewing direction (i.e., from a driving-seat direction) and a second image (i.e., a TV or DVD image) to be displayed so as to be viewable from a left viewing direction (i.e., from a front-passenger-seat direction).

As shown in FIGS. 7 and 8, in the dual-display liquid crystal display device 10A, a barrier panel 12 is attached to the front surface of a liquid crystal panel 11 by using an ultraviolet curing adhesive layer 13. The liquid crystal panel 11 is, for example, a WVGA-type liquid crystal panel for displaying color images, in which, as shown in FIG. 1, 800 pixels are formed in a horizontal direction (i.e., in a direction along scanning lines 26, which will be described below) and 480 pixels are formed in a vertical direction (i.e., in a direction along signal lines 31, which will be described below). One pixel is formed of three sub-pixels which display three primary colors of red (R), green (G) and blue (B), respectively, and by performing control of brightness of each of the three sub-pixels, the pixel displays a desired color. As shown in FIG. 2, an image resulting from combination of a first image and a second image is inputted to the liquid crystal panel 11. This combination is performed by selecting sub-pixels forming a checkered pattern out of the sub-pixels arrayed in the first image, and sub-pixels forming a checkered pattern out of the sub-pixels arrayed in the second image.

As shown in FIG. 3, a barrier layer 14 functioning as a light-shielding film in the barrier panel 12 has rectangular apertures 15. Each of these apertures 15 is placed at a boundary between a pair of sub-pixels located adjacent to each other in a horizontal direction. As shown in FIG. 4A, the apertures 15 formed in the barrier layer 14 allow the first image to be viewed from a driving-seat direction, but not to be viewed from a front-passenger-seat direction, and further, the second image to be viewed from the front-passenger-seat direction, but not to be viewed from the driving-seat direction. In this way, the barrier panel 12 allows an image resulting from combination of the first image and the second image and being displayed on the liquid crystal panel 11 to be separately identified from two different directions. The dual-display liquid crystal display device 10A is designed on the assumption that it is installed midway between the driving seat and the front passenger seat, and further, for example, on the assumption that the driving-seat direction extends at an angle of 30 degrees relative to a centerline of the liquid crystal display panel 11 in a right direction relative to the liquid crystal display panel 11, and the front-passenger-seat direction extends at an angle of 30 degrees relative to a centerline of the liquid crystal display panel 11 in a left direction relative to the liquid crystal display panel 11. Therefore, as shown in FIG. 4B, this dual-display liquid crystal display device 10A is designed so as to obtain maximum brightness under a condition where the viewing angle is −30 degrees or +30 degrees.

In FIG. 5, image overlapping of the first image which can be observed in the case where the dual-display liquid crystal display device 10A is viewed from a viewing direction at an angle of 30 degrees relative to a centerline thereof in a right direction, and the second image which can be observed in the case where the dual-display liquid crystal display device 10A is viewed from a viewing direction at an angle of 30 degrees relative to a centerline thereof in a left direction, is shown. That is, in the case where the dual-display liquid crystal display device 10A is viewed from a viewing direction at an angle of 30 degrees relative to a centerline thereof in a right direction relative thereto, the first image is identified through portions each being denoted by "R" in FIG. 5, and a region other than the portions each being denoted by "R" is observed as a light-shielding area 16 which is light-shielded by the barrier panel 12. On the other hand, in the case where the dual-display liquid crystal display device 10A is viewed from a viewing direction at an angle of 30 degrees relative to a centerline thereof in a left direction relative thereto, the second image is identified through portions each being denoted by "L" in FIG. 5, and a region other than the portions each being denoted by "L" is observed as a light-shielding area 16 which is light-shielded by the barrier panel 12. Therefore, it appears to viewers as if each of aperture areas 17 formed in the light-shielding area 16 were substantially located at a center portion of each sub-pixel in the barrier panel 12.

Next, a configuration of each sub-pixel area in the dual-display liquid crystal display device 10A will be described below with reference to FIGS. 6 to 8. As shown in FIGS. 7 and 8, in the dual-display liquid crystal display device 10A, the barrier panel 12 is attached to the front surface of the liquid crystal panel 11 by using the ultraviolet curing adhesive layer 13. The liquid crystal panel 11 includes a liquid crystal layer 18, and an array substrate 19 and a color filtering substrate 20 having the liquid crystal layer 18 interposed therebetween and being formed on the back side and the front side of the liquid crystal layer 18, respectively. The thickness of the liquid crystal layer 18 is maintained uniform by using either columnar spacers composed of a photopolymer material or spherical spacers (not shown in figures) being disposed by dispersion and composed of a resin material or a silica material. On the back side of the array substrate 19, a first polarization plate 21 is formed, and on the front side of the barrier panel 12, a second polarization plate 22 is formed. Moreover, light rays are emitting from a backlight 23 formed on the back side of the first polarization plate 21.

The array substrate 19 includes a first substrate main body 24 as a base thereof, which is composed of glass, quartz, plastic, or the like. Further, on this first substrate main body 24, gate electrodes G and storage capacitor lower electrodes 25 are formed. In each sub-pixel area, the gate electrode G is formed by extending one of scanning lines 26 extending in an X-axis direction shown in FIG. 6. Moreover, the storage capacitor lower electrode 25 is formed by extending one of storage capacitor lines 27 extending in the X-axis direction shown in FIG. 6. A first insulating film (a gate insulating film) 28, which is composed of silicon nitride, silicon oxide or the like, is formed so as to cover the gate electrodes G, the scanning lines 26, the storage capacitor lower electrodes 25 and the storage capacitor lines 27.

Semiconductor layers 29 composed of amorphous silicon are formed on the first insulating film 28, and further, in each sub-pixel, a source electrode S and a drain electrode D are formed so as to be mounted partially on the semiconductor layer 29, respectively. In each sub-pixel, a storage capacitor upper electrode 30 is formed by extending a drain electrode D, and the storage capacitor lower electrode 25, the storage capacitor upper electrode 30 and the first insulating film 28 interposed therebetween form a storage capacitor section C. In each sub-pixel, further, the semiconductor layer 29 is formed on the insulating film 28 covering the gate electrode G and is formed so as to be opposite the gate electrode G. Such elements as the semiconductor layer 29, the source electrode S, the drain electrode D and the gate electrode G form a TFT. A source electrode S in an adjacent sub-pixel area located in a Y-axis direction shown in FIG. 6 is electrically connected to one of signal lines 31 extending in the Y-axis direction. A second insulating film 32 is formed so as to cover the signal lines 31 and the drain electrodes D.

So as to cover the second insulating film 32, a first resin layer (an inter-layer film) 33 is formed, and further, on this first resin layer 33, pixel electrodes 34 composed of a transparent conductive material are formed. In each sub-pixel, a contact hole 35 is formed so as to pass through the first resin layer 33 and the second insulating film 32 and reach the drain electrode D, and further, via this contact hole 35, the pixel electrode 34 and the drain electrode D are electrically connected to each other. A first alignment film 36 composed of, for example, polyimide is formed so as to cover the pixel electrodes 34 and the first resin layer 33.

The color filtering substrate 20 includes a second substrate main-body 37 as a base thereof, which is composed of glass, quartz, plastic, or the like, and on this second substrate main-body 37, a color filter (CF) layer 38, through which different color light rays (R, G, B, or colorless) specific to respective sub-pixel areas are passed, and a black matrix (BM) layer 39 operating as a light-shielding films are formed. The BM layer 39 is formed where being overlapping, in plan view, the scanning lines 26, the signal lines 31, the TFTs, the storage capacitor lower electrodes 25 and the storage capacitor upper electrodes 30. Therefore, each storage capacitor section C is located, in plan view, within the area of the BM layer 39. A second resin layer (an overcoat layer) 40 is formed so as to cover the BM layer 39 and the CF layer 38 in plan view. Further, a common electrode 41, which is composed of a transparent conductive material, is formed so as to cover the second resin layer 40. Moreover, a second alignment film 42, which is composed of, for example, polyimide, is formed so as to cover the common electrode 41. In addition, the liquid crystal layer 18 is sealed within a sealing area being composed of a sealing material (not shown in figures) and formed between the array substrate 19 and the color filtering substrate 20.

The barrier panel 12 includes a third substrate main-body 43 as a base thereof, which is composed of glass, quartz, plastic, or the like, and on this third substrate body 43, the barrier layer 14, which allows the above-described first and second images to be identifiable from different viewing directions, are formed. Further, a third resin layer 44 is formed so as to cover the barrier layer 14.

By providing such a configuration as described above, in association with light rays emitting from the backlight 23, a TFT in each sub-pixel is caused to be turned on/off through control signals transmitted via one of the scanning lines 26 and one of the signal lines 31, and further, in accordance with the turning on/off of the TFT, the intensity of an electric field generated between the pixel electrode 34 and the common electrode 41 varies. The storage capacitor section C retains the level of a voltage applied between the pixel electrode 34 and the common electrode 41 for a prescribed period of time. The electric field generated between the pixel electrode 34 and the common electrode 41 causes individual liquid crystal molecules included in the liquid crystal layer 18 to change alignment directions thereof, and as a result, in accordance with the alignment direction changes of the individual liquid crystal molecules, a transparency ratio with respect to light rays emitting from the backlight 23 varies. Thus, varying of the brightness of each sub-pixel area in such a way as described above enables forming of the first and second images. Furthermore, the barrier layer 14 allows the first image to be identifiable from a driving-seat direction at an angle of 30 degrees relative to a centerline of the liquid crystal display panel 11 in a right direction relative to the liquid crystal display panel 11, and the second image to be identifiable from a front-passenger-seat direction at an angle of 30 degrees relative to a centerline of the liquid crystal display panel 11 in a left direction relative to the liquid crystal display panel 11.

Next, the storage capacitor section C will be described below with reference to FIG. 6. All elements of the gate electrode G, the storage capacitor line 27 and the storage capacitor lower electrode 25 shown in FIG. 6 are composed of an opaque material, such as aluminum or aluminum base alloy. As described above, the storage capacitor section C is formed of the storage capacitor lower electrode 25 formed by extending one of the storage capacitor lines 27, the storage capacitor upper electrode 30 formed by extending the drain electrode D, and the first insulating film 28 interposed between the storage capacitor lower electrodes 25 and the storage capacitor upper electrodes 30. In addition, a portion of the storage capacitor lines 27, which is overlapped by the storage capacitor upper electrodes 30 in plan view, is included in the storage capacitor section C.

The storage capacitor lower electrode 25 includes a first lower electrode 25A extending along the scanning line 26 and a second lower electrode 25B extending along the signal line 31. Further, the second lower electrode 25B includes two lower electrodes, one being a second lower-left electrode 25BL extending along the signal line 31 (a left-side signal line shown in FIG. 6) connected to the currently-targeted sub-pixel, the other one being a second lower-right electrode 25BR extending along the signal line 31 (a right-side signal line shown in FIG. 6) connected to a sub-pixel located adjacent to the right-side of the currently-targeted sub-pixel). The first lower electrode 25A includes a lower exposed portion 25C, which is exposed through each of the aperture areas 17 (refer to FIG. 5) formed in the barrier panel when viewed from an oblique direction. In other words, the first lower electrode 25A includes the lower exposed portion 25C which is not light-shielded by the light-shielding area 16 (refer to FIG. 5) for shielding light rays related to both the displays of the dual display. In addition, the second lower electrode 25B is entirely light-shielded, in plan view, by the light-shielding area 16 for shielding light rays related to both the displays of the dual display.

The storage capacitor upper electrode 30 includes a first upper electrode 30A extending along the scanning line 26 and a second upper electrode 30B extending along the signal line 31. Further, the second upper electrode 30B includes two upper electrodes, one being a second upper-left electrode 30BL extending along the signal line 31 (a left-side signal line shown in FIG. 6) connected to the currently-targeted sub-pixel, the other one being a second lower-right electrode 25BR extending along the signal line 31 (a right-side signal line shown in FIG. 6) connected to a sub-pixel located adjacent to the right-side of the currently-targeted sub-pixel). The first upper electrode 30A includes an upper exposed portion 30C, which is exposed through each of the aperture areas 17 formed in the barrier panel when viewed from an oblique direction. In other words, the first upper electrode 30A includes the upper exposed portion 30C which is not light-shielded by the light-shielding area 16 for shielding light rays related to both the displays of the dual display. The second upper electrode 30B is entirely light-shielded, in plan view, by the light-shielding area 16 for shielding light rays related to both the displays of the dual display.

Forming the first upper electrode 30A, the second upper-left electrode 30BL and the second upper-right electrode 30BR so as to be substantially overlapping, in plan view, the first lower electrode 25A, the second lower-left electrode 25BL and the second lower-right electrode 25BR, respectively, causes each of the resultant overlapping portions to be a pair of storage capacitor electrodes. The total capacitance of these individual storage capacitors forms the capacitance of the storage capacitor section included in each of the sub-pixels. Allowing the storage capacitor section to be formed of two storage capacitors extending along the signal lines 31 by utilizing two long areas extending along the signal lines 31 and being located within the light-shielding area 16 for shielding light rays related to both the displays of the dual display, in such a way as described above, enables realization of a large storage capacitance without reducing an aperture ratio.

Both the first upper electrode 30A and the first lower electrode 25A are rectangular in shape and are symmetric with respect to a centerline between the signal lines located at both sides of each sub-pixel area. Further, the first upper electrode 30A does not extend beyond the edges of the first lower electrode 25A, in plan view, in the Y-axis direction shown in FIG. 6. Therefore, since an opaque area, which is located at the center lower portion of each sub-pixel area and is exposed through one of the aperture areas 17 formed in the barrier panel when viewed from an oblique direction, is symmetric with respect to a centerline between the signal lines 31 located at both sides of each sub-pixel area, the characteristic of brightness relative to a viewing angle associated with each of the displays is bilaterally symmetric.

In addition, even in the case where both the first upper electrode 30A and the first lower electrode 25A are not rectangular in shape, provided that the shape of an area resulting from overlapping the first upper electrode 30A with the first lower electrode 25A in plan view is symmetric with respect to a centerline between the signal lines 31 located at both sides of each sub-pixel area, the characteristic of brightness relative to a viewing angle associated with each of the displays is bilaterally symmetric. For example, even in the case where an overlapped area is not rectangular in shape, a condition in that an entirely overlapping area is rectangular in shape allows the characteristic of brightness with respect to a viewing angle associated with each of the displays to be bilaterally symmetric, and further, the entirely overlapping area may be trapezoidal in shape, provided that it is line-symmetric.

The second lower-left electrode 25BL and the second lower-right electrode 25BR of each sub-pixel area are formed so as to extend along the signal lines 31 up to the maximum length of a display region formed in the sub-pixel area in order to prevent light rays from leaking between sub-pixel areas. In the contrast, the second upper-left electrode 30BL and the second upper-right electrode 30BR are formed so as to extend along the signal lines up to approximately only half the length of the display region. The reason for this is as described below. That is, provided that a semiconductor material remains in a portion between the signal line 31 and the second upper-right electrode 30BR and/or a portion between the signal line 31 and the second upper-left electrode 30BL when forming the semiconductor layer 29 of the TFT during a manufacturing process, the portions, where the semiconductor material remains, form portions of the TFT, which cause bright dot defects. However, shortening of the extension lengths of the second upper-left electrode 30BL and the second upper-right electrode 30BR enables reducing of the probability of arising of bright dot defects due to the phenomenon described above.

Second Embodiment

Next, a dual-display liquid crystal display device 10B according to a second embodiment will be described below with reference to FIG. 9. In addition, in FIG. 9, elements the same as those included in the liquid crystal display device 10A according to the first embodiment are denoted by the same reference symbols, and further, detailed description of the same elements will be omitted below. This dual-display liquid crystal display device 10B according to the second embodiment is equivalent to a dual-display liquid crystal display device resulting from removing of the second upper-right electrode from the elements included in the dual-display liquid crystal display device 10A according to the first embodiment.

In the same way as or in a way similar to that in the case of the first embodiment, the storage capacitor upper electrode 51 includes a first upper electrode 51A extending along the scanning line 26 and a second upper electrode 51B extending along the signal line 31, and the second upper electrode 51B includes only one upper electrode extending along the signal line 31 connected to the currently-targeted sub-pixel, but does not include an upper electrode extending along the signal line connected to a sub-pixel adjacent to the right side of the currently-targeted sub-pixel. Forming a drain electrode so as not to be close to the signal line 31 connected to the sub-pixel adjacent to the currently-targeted sub-pixel, in such a way as described above, enables reducing of the probability of occurrence of electric cross-talk due to the signal line 31 connected to the sub-pixel adjacent to the currently-targeted sub-pixel, to which a control signal different from a control signal used for the currently-targeted sub-pixel is transmitted.

In the dual-display liquid crystal display device 10B according to the second embodiment, it is preferable to make the width of the second upper electrode 51B be wider by the size of a width of the second upper-right electrode 30BR which is removed from the elements included in the dual-display liquid crustal display device 10A according to the first embodiment. Further thereto, the position of an aperture area 52 viewed from an oblique direction relative to the barrier panel can be shifted in a right direction. Moreover, in the same way as or in a way similar to that in the case of the dual-display liquid crystal display device 10A according to the first embodiment, a storage capacitor lower electrode 53 includes a first lower electrode 53A extending along the scanning line 26 and a second lower electrode 53B extending along the signal line 31, and further, the second lower electrode 53B includes two lower electrodes, one being a second lower-left electrode 53BL extending along the signal line connected to the currently-targeted sub-pixel, the other one being a second lower-right electrode 53BR extending the signal line connected to a sub-pixel adjacent to the right side of the currently-targeted sub-pixel. Furthermore, the width of the second lower-left electrode 53BL is made wider and the width of the lower-right electrode 53BR is made narrower, by the size of a width of the upper-right electrode 30BR which is removed from the elements included in the dual-display liquid crustal display device 10A according to the first embodiment. Therefore, even when the width of the second upper electrode 51B is made wider, a storage capacitor section formed along the signal line 31 is still within the light-shielding area for shielding light rays related to both the displays of the dual display. Shifting the position of the aperture area 52 viewed from an oblique direction relative to the barrier panel in a right direction, in such a way as described above, enables reducing of the probability of occurrence of electric crosstalk without reducing an aperture ratio and a storage capacitance.

Additionally, since the above-described combined images are arrayed in a checkered pattern, the shape of each of the apertures formed in the barrier layer is rectangular, however, the invention can be applied to a dual-display liquid crystal display device, such as a dual-display liquid crystal display device disclosed in JP-A-2008-164740, which includes a barrier layer, the aperture of which corresponds to the whole of a center portion of one sub-pixel area, that is, in which the combined images are arrayed in a stripe pattern. Furthermore, the invention can be applied to a three-dimensional liquid crystal display device capable of displaying a plurality of images so that they can be identified from the same viewing direction.

What is claimed is:

1. A dual-display liquid crystal display device, comprising:
a display panel configured to include therein first sub-pixels displaying a first image and second sub-pixels displaying a second image, the first sub-pixels and the second sub-pixels being alternately and adjacently disposed; and
a barrier panel configured to include therein a light-shielding film having apertures therein which allow the first image and the second image to be identifiable from a first viewing direction and a second viewing direction, respectively,
wherein the display panel is configured to be a liquid crystal display device including a first substrate and a second substrate being located so as to be opposite each other and having a liquid crystal layer interposed therebetween, wherein the first substrate includes therein scanning lines and signal lines arrayed in a matrix, thin film transistors each being located so as to be adjacent a position where one of the scanning lines and one of the signal lines intersect each other, storage capacitor lines formed so as to be parallel with the scanning lines, and sub-pixels each having therein a storage capacitor lower electrode formed by extending one of the storage capacitor lines, a storage capacitor upper electrode formed by extending a drain electrode of one of the thin film transistors, and an insulating film formed between the storage capacitor lower electrode and the storage capacitor upper electrode, wherein the storage capacitor lower electrode, the storage upper electrode and the insulating film form a storage capacitor section,
wherein the storage capacitor upper electrode includes a first upper electrode extending along the scanning lines and a second upper electrode extending along the signal lines, and the storage capacitor lower electrode includes a first lower electrode extending along the scanning lines and a second lower electrode extending along the signal lines,
wherein, from the first viewing direction and the second viewing direction, the first upper electrode and the first lower electrode are configured to have a portion exposed out of a light-shielding area of the barrier panel, the shape of the exposed portion being symmetric with respect to a centerline between the signal lines, and the second upper electrode and the second lower electrode are configured to be overlapped, in plan view, by the light-shielding area of the barrier panel.

2. The dual-display liquid crystal display device according to claim 1, wherein the length of the second upper electrode extending along the signal lines is shorter than or equal to half the length along the signal lines of the sub-pixel.

3. The dual-display liquid crystal display device according to claim 1, wherein the second upper electrode is formed of two electrodes extending along the signal lines at both sides of the sub-pixel, respectively.

4. The dual-display liquid crystal display device according to claim 1, wherein the second upper electrode is formed of one electrode extending along the signal line at one side of the sub-pixel.

* * * * *